S. W. Wright,
Bolt Cutter.
N°. 62,462.    Patented Feb. 26, 1867.
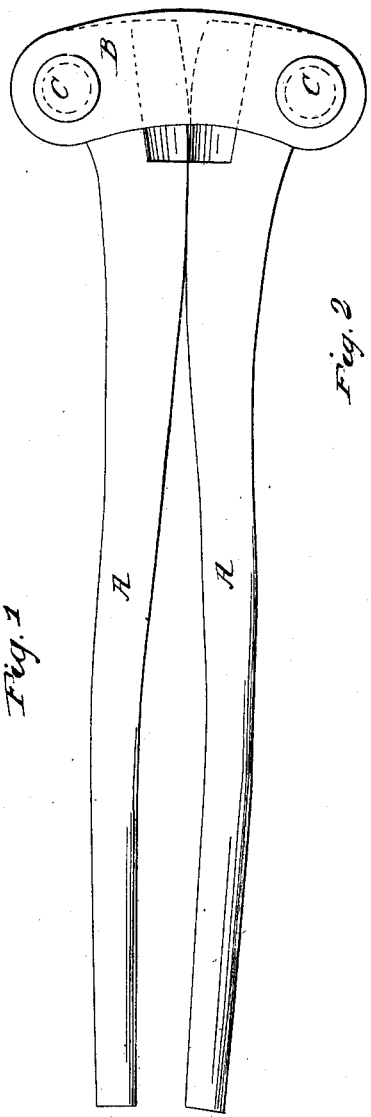
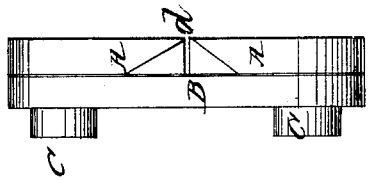
Witnesses.
Theo Fusche
J. A. Service
Inventor
Silas W. Wright
Per Munn &
Attorneys

United States Patent Office.

SILAS W. WRIGHT, OF ELLSWORTH, NEW YORK, ASSIGNOR TO HIMSELF AND S. J. WRIGHT, OF SAME PLACE.

Letters Patent No. 62,462, dated February 26, 1867.

IMPROVED BOLT-CUTTING SHEARS.

The Schedule referred to in these Letters Patent and making part of the same.

TO ALL WHOM IT MAY CONCERN:

Be it known that I, SILAS W. WRIGHT, of Ellsworth, in the county of St. Lawrence, and State of New York, have invented a new and useful improvement in Iron Shears; and I do hereby declare that the following is a full, clear, and exact description thereof, which will enable others skilled in the art to make and use the same, reference being had to the accompanying drawings, forming part of this specification.

This invention relates to a method of cutting and turning the ends of bolts and rivets in blacksmiths' and other iron or metallic work; and it consists in attaching cutting-levers to a cross-piece, upon which they are allowed to turn, and whereby the cutting edges are given a drawing or rolling stroke, as will be described.

Figure 1 represents the shears as complete; and

Figure 2 is an end view, showing the cross-piece and the cutting edges.

Similar letters of reference indicate like parts.

A represents the cutting-levers. B is the cross-piece, to which the levers are attached, the point of attachment forming the centres of motion of the levers. C represents the bolts or rivet-pins by which the levers are attached to the cross-piece. The instrument is formed of suitable metal, the cutting portion of the levers of course being steel, and shown in dotted lines. The cross-piece B is a plain piece of metal, made in any convenient form. The cutting-levers A are of suitable length and are attached to the cross-piece by bolts or rivets in a substantial manner, forming joints at the cutting ends. The cutting edges are so formed that, in cutting, the edges have a drawing or rolling motion like the edges or peripheries of two moving cams or eccentrics. The cutting edges are somewhat circular in form, but in the process of cutting the whole cutting edge of each lever may operate.

This tool is particularly intended for cutting and trimming the ends of bolts and rivets, but it may be useful for many other similar purposes.

The space marked d forms a recess for receiving the end of the bolt or rivet when the outer ends of the levers are extended. When these ends are brought together the cutting edges come in contact with each other like the cutting edges of two eccentrics, moving upon their centres and severing any intervening obstacle.

Having thus described my invention, what I claim as new, and desire to secure by Letters Patent, is—

The cutting-levers A A and the cross-piece B, constructed, arranged, and combined substantially as herein shown and described and for the purposes set forth.

SILAS W. WRIGHT.

Witnesses:
    J. B. ELLSWORTH,
    J. BARNES.